Figure 1:
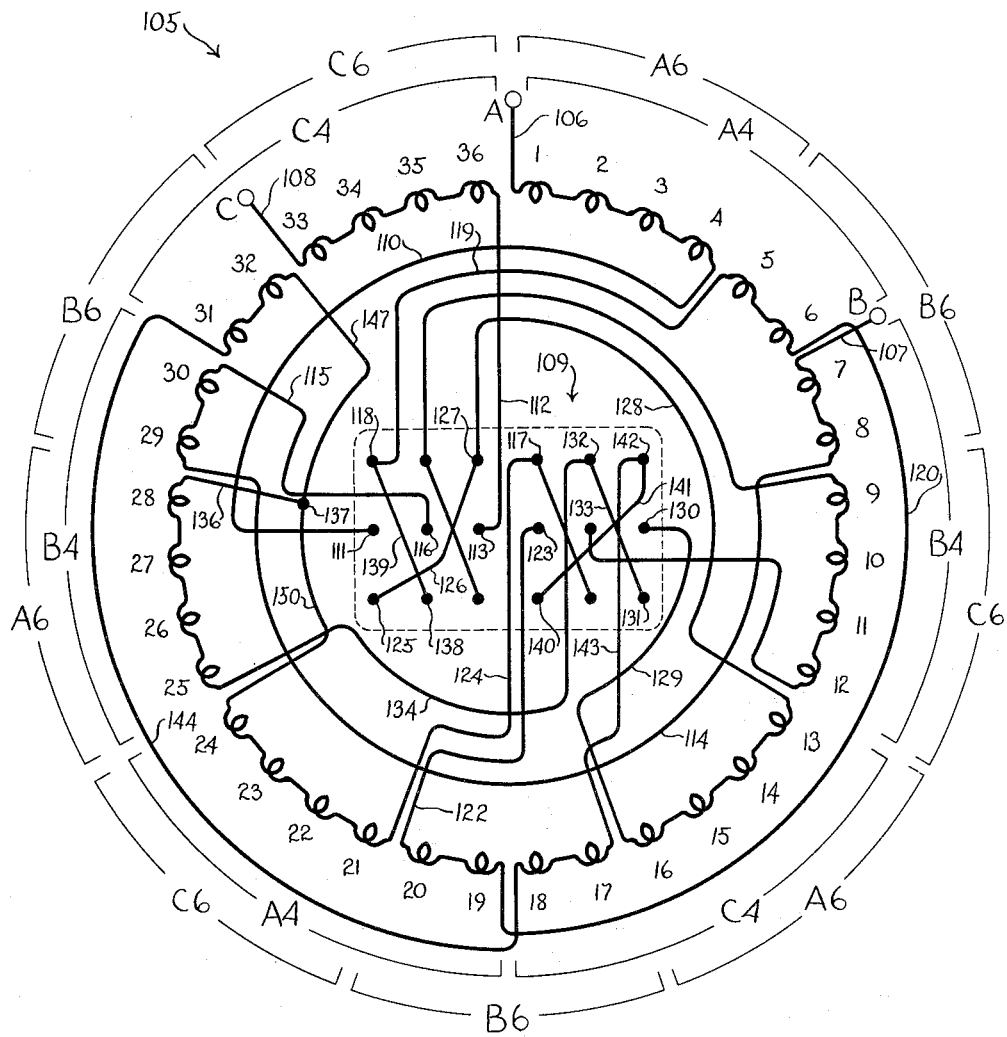

Aug. 9, 1955  C. S. SISKIND  2,715,204

TWO-SPEED POLYPHASE INDUCTION MOTOR

Filed July 6, 1954  4 Sheets-Sheet 1

Inventor
Charles S. Siskind
By Ira Milton Jones
Attorney

Aug. 9, 1955 C. S. SISKIND 2,715,204
TWO-SPEED POLYPHASE INDUCTION MOTOR
Filed July 6, 1954 4 Sheets-Sheet 4
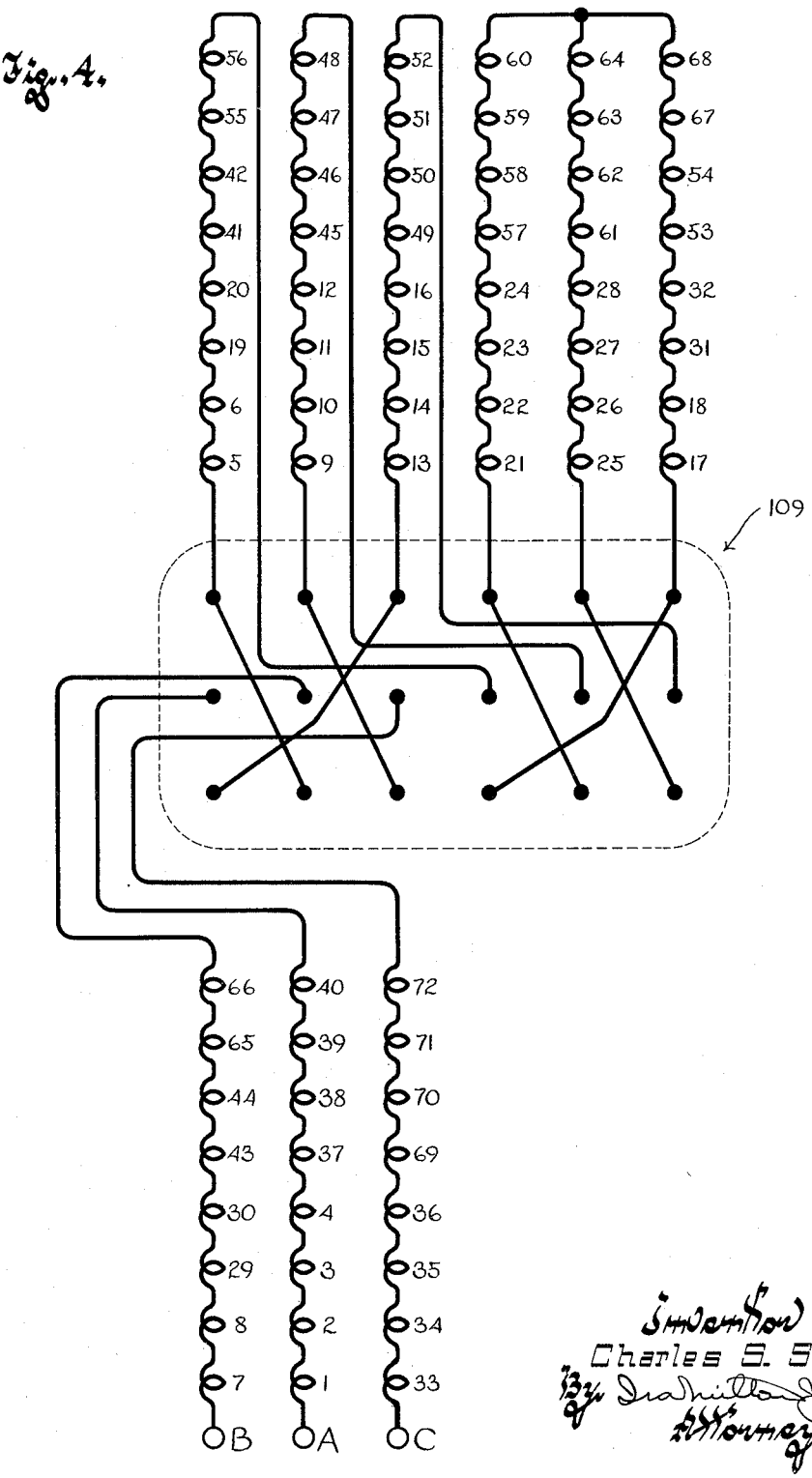

United States Patent Office 2,715,204
Patented Aug. 9, 1955

2,715,204

TWO-SPEED POLYPHASE INDUCTION MOTOR

Charles S. Siskind, West Lafayette, Ind.

Application July 6, 1954, Serial No. 441,199

5 Claims. (Cl. 318—224)

This invention relates to polyphase induction motors, and refers more particularly to multiple speed polyphase induction motors having a single stator winding.

One means heretofore used to obtain different speeds in a polyphase induction motor has been to provide a plurality of windings on the stator, selectively energizable to provide the different motor speeds. While this expedient permits of considerable flexibility in the design speeds with which the motor can be provided, it has a serious disadvantage in that it entails relatively high labor and material costs and makes for a bulky winding, increasing the size of the motor.

As an alternative to the employment of multiple windings, it has also been conventional practice heretofore to employ a single stator winding, the coils of which can be so energized as to provide a number of true poles at the high speed of the motor and twice that number of poles, half of which are true and the other half of which are consequent poles, to provide the low motor speed. However, while this expedient has the advantage of requiring only a single stator winding, it is disadvantageous in that it does not permit flexibility in the selection of design speeds for the motor since the high speed always has to be exactly twice the low speed, as, for example, 1800 R. P. M. and 900 R. P. M. or 1200 R. P. M. and 600 R. P. M. Moreover, since the winding of a motor operating in the manner just described has to be a compromise design for the two speeds, the motor necessarily operates with decreased efficiency at both of its speeds.

By contrast, it is an object of the present invention to provide a polyphase asynchronous motor having a single winding and capable of operating with good efficiency at either of two predetermined speeds, the ratios of which are less than two-to-one, and which, for example, on 60 cycles, may be 1800 and 1200 R. P. M., 900 and 720 R. P. M., 1200 and 900 R. P. M., or 900 and 600 R. P. M.

Another object of this invention resides in the provision of a two-speed polyphase asynchronous motor having a speed ratio on the order of the examples just cited and employing a single stator winding, but wherein the number of phase groupings and pole groupings has been reduced to a minimum to greatly simplify the control unit.

Still another object of the present invention resides in the provision of a multi-speed polyphase induction motor employing a single conventional lap wound stator winding and employing standard stator laminations, so that no major changes in manufacturing procedures are necessary in adapting a conventional asynchronous motor to the principles of this invention.

The foregoing objectives are achieved in the motor of this invention by means of a novel system of connections whereby the motor operates with consequent poles at both of its speeds. As a result, certain other objects are attained by means of the motor of the present invention, namely:

Normal leakage reactance at both speeds of the motor;

Small number of coil end leads brought to the exterior of the motor, thereby simplifying switch requirements;

Minimization of the difference in winding factors between the coil combinations for the two speeds of the motor;

Employment of the entire stator winding at both motor speeds;

Adaptability to design for constant torque operation; and

Balance of the locations and magnitude of the true poles about the stator circumference at both speeds of the motor to assure smooth operation.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

Figure 2:
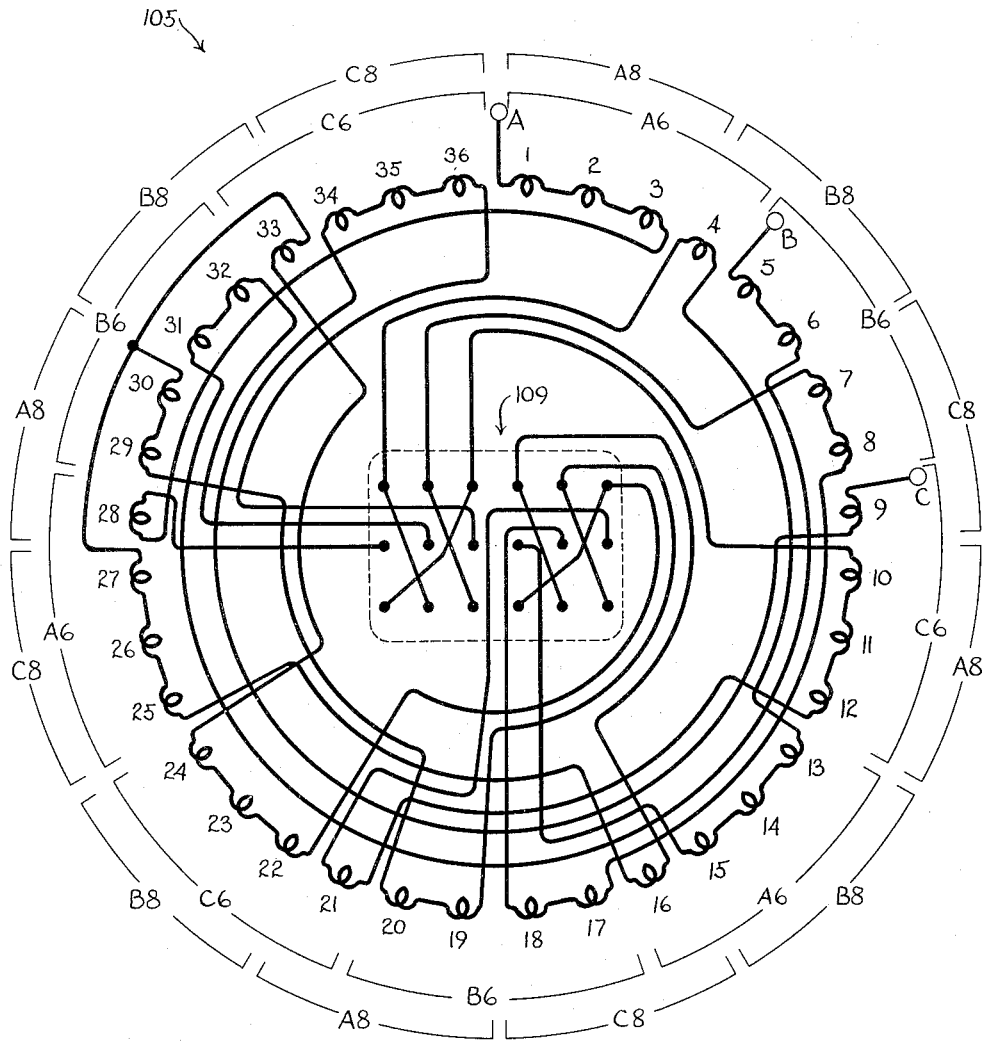
Figure 3:
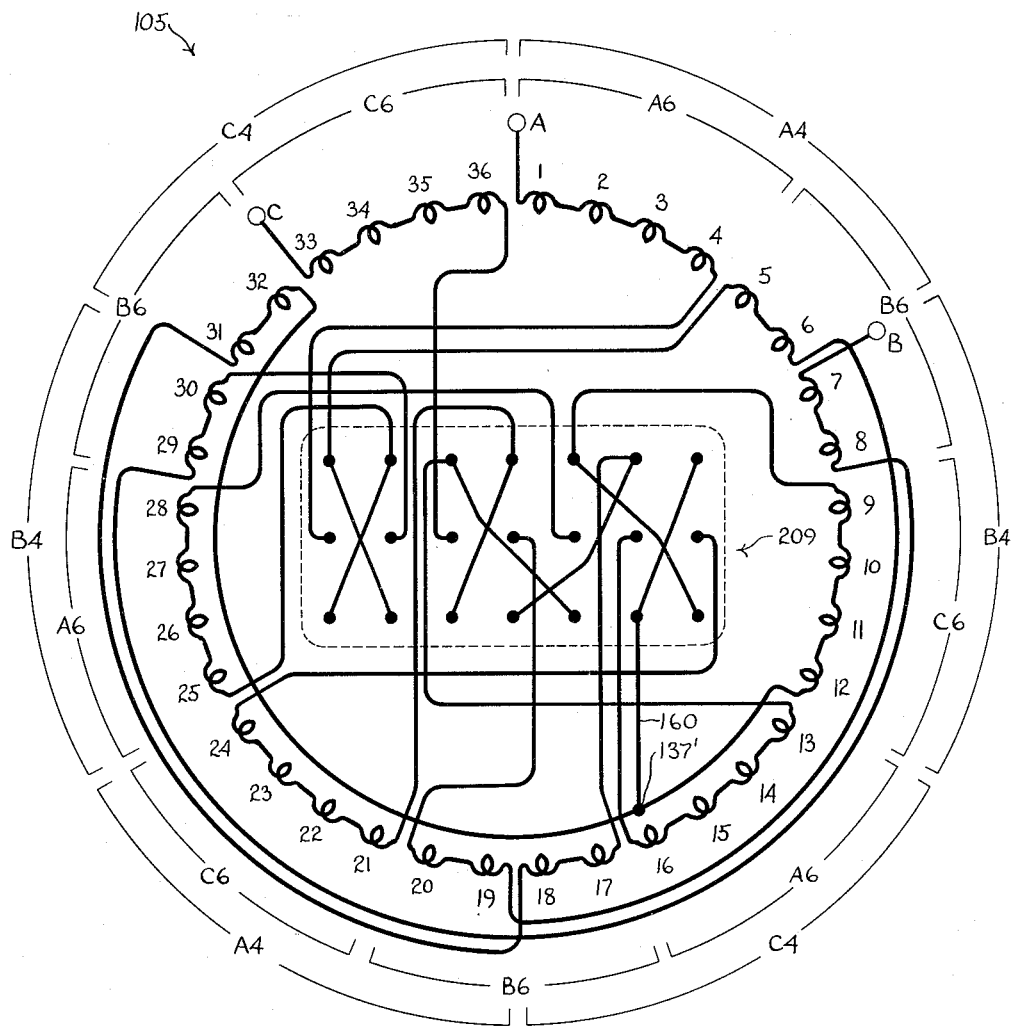

The accompanying drawings illustrate several complete examples of the physical embodiments of the invention constructed according to the best modes so far devised for the practical application of the principles thereof, and in which:

Figure 1 is a circular diagram of a stator circuit embodying one adaptation of the invention, as applied to a 3-phase, 36-slot stator designed for 4- and 6-pole operation at motor speeds of 1800 R. P. M. and 1200 R. P. M., respectively;

Figure 2 is a diagram similar to Figure 1 but showing the invention applied to a motor having a 36-slot stator to provide 6- and 8-pole operation at 1200 R. P. M. and 900 R. P. M., respectively;

Figure 3 is a diagram of another embodiment of the invention, as applied to a 36-slot stator for 4- and 6-pole operation, but employing a somewhat different switching arrangement than that shown in the other versions; and Figure 4 is a schematic diagram showing the invention applied to a 72-slot stator for 8- and 12-pole operation.

Referring now more particularly to the accompanying diagrams, the numerals 1 to 72 are used throughout the several views to individually designate the several coils comprising, in each instance, a single stator winding 105 for a three-phase induction motor having a squirrel cage rotor (not shown) of a well-known type.

As is well known to those skilled in the art, the coils of the stator winding are lap wound and disposed in slots in the stator laminations (not shown).

Certain of the adjacent coils of the winding are directly connected in series with one another to form coil groups, by reason of the fact that the conductor which forms the several coils in each group is continuous and unbroken through the group of coils, and it will immediately be noted at this point that a relatively small number of leads is brought out of the winding. One end of each of three coil groups is connected with an input lead 106, 107 and 108, respectively, and these input leads connect with terminals A, B and C which are in turn connectible with mains (not shown) which provide a source of 3-phase A. C. for the motor. The three terminals A, B and C thus correspond to the three current phases applied to the stator winding.

The several coil groups are connectible in two different circuit arrangements, by means of a multi-pole double-throw switch designated generally by 109. With the switch in the Figure 1 embodiment in its "up" position, the motor operates with four poles for each current phase, comprising two true poles and two consequent poles, while with the switch in its "down" position it operates with six poles for each current phase, comprising three true and three consequent poles. Attention is directed to the fact that the double-throw switch is not a main switch but is employed merely to select between the two alternative circuit arrangements to determine the speed at which the motor is to operate, and a main switch (not shown) is intended to be connected between the terminals A, B, C and the A. C. supply mains.

In the embodiment of the invention shown in Figure 1, the coil groups are disposed around the stator in alternate pairs of large and small coil groups, each large group having four coils and each small group having two. More specifically, coils 1, 2, 3 and 4 are interconnected to form a single large group; coils 5 and 6 are interconnected to form a small group; coils 7 and 8 are interconnected to form another small group; coils 9, 10, 11 and 12 and coils 13, 14, 15 and 16 are connected to form a pair of adjacent large groups; and so on around the stator. These coil groups are connectible with one another through the switch 109. In the "down" position of the switch each of the large coil groups forms a polar belt, and each pair of adjacent small coil groups together form a polar belt; while in the "up" position of the double-throw switch each large group is connected, through the switch, with its adjacent small coil group to form therewith a 6-coil polar belt.

It will be seen from Figure 1 that the input lead 106 is connected directly with one end of the group comprising the coils 1, 2, 3 and 4, while the other end of this group is connected through a conductor 110 with a center terminal 111 of the switch. Thus the coils 1, 2, 3 and 4 are at all times energized by current of the A-phase. Similarly, the coils 33, 34, 35 and 36 are connected with terminal "C" through input lead 108 and through lead 112 with a center terminal 113 of the switch. Input lead 107 connects the "B" terminal with the small group comprising coils 7 and 8, and the other end of this coil group is connected by means of conductor 114 with another small group of coils 29, 30, and the other end of the latter, in turn, is connected by means of a conductor 115 with another center terminal 116 of the switch.

It will be observed that with the switch in its "up" position, A-phase current is carried from the terminal 111 to the terminal 118 and thence by way of conductor 119 to the group comprising coils 5 and 6 and by way of conductor 120 connected with the other end of this coil group to the group comprising coils 19 and 20, and thence by way of conductor 122 to another center terminal 123 of the switch. Through the switch and conductor 124, connected with upper switch terminal 117, the coils 21—24, inclusive, are also energized with A-phase current. It will thus be seen that with the switch in its "up" position, A-phase current is applied to coils 1—6, inclusive, and to coils 19—24, inclusive. Since the two belts comprising these coils are diametrically opposite one another on the stator, and since the current is applied to them in the same direction, the two belts just defined provide diametrically opposite poles of like polarity, and consequent poles of opposite polarity are formed at right angles to them. The belts of coils which form these true poles are designated by brackets A–4 in Figure 1.

Similarly, the Figure 1 circuit diagram may be traced to show that in the "up" position of the switch, B-phase current is applied to coils 7—12, inclusive, and to diametrically opposite coils 25—30, inclusive, as designated by brackets B–4, while C-phase current is applied to coils 13—18, inclusive, and diametrically opposite coils 31—36, inclusive, as designated by brackets C–4. Hence there are a pair of diametrically opposite true poles of like polarity for each of the current phases, A, B and C, and a pair of consequent poles for each current phase. Thus in the "up" position of the switch the motor operates at 1800 R. P. M. (assuming that the motor is energized by 60 cycle current), this being its high speed.

In the "down" position of the switch the motor operates with six poles for each current phase (three true poles and three consequent poles), this being its low speed of 1200 R. P. M. In the "down" position of the switch, A-phase current is carried from the switch terminal 111 to lower switch terminal 125 and is thence conducted by means of a crossover lead 126 to upper terminal 127 of the switch, which connects through lead 128 with the coil group 13, 14, 15, 16. The other end of this coil group is connected by means of lead 129 with center terminal 130 of the switch, and current is thence carried to lower terminal 131, which is connected with upper terminal 132 of the switch by means of crossover lead 133, and from terminal 132 conductor 134 conducts the A-phase current to coil group 25, 26, 27, 28, which is connected by means of conductor 136, with a junction 137 whereby the stator coils are Y-connected with one another in both positions of the switch.

Thus, tracing the A-phase current in the "down" position of the switch it will be seen that three large coil groups, designated by brackets A–6 and each comprising 4 coils, are energized by A-phase current, and since these coil groups are equispaced circumferentially around the stator, and current flows through all of them in the same direction, they provide three true poles of like polarity and, of course, three consequent poles. In the "down" position of the switch, B-phase current, which is applied to the coil group 7, 8 through input lead 107 and coil group 29, 30 through interconnecting lead 114, is brought to the center terminal 116 of the switch through the lead 115 and thence, being imposed upon lower switch terminal 138, is carried to upper switch terminal 118 by means of crossover lead 139; from terminal 118, B-phase current is imposed upon coils 5, 6 by means of conductor 119 and coils 19, 20 by means of conductor 120. From coils 19, 20, B-phase current flows to center switch terminal 123 by way of lead 122 and thence, being imposed upon lower switch terminal 140, is carried by means of a crossover 141 to upper switch terminal 142. One end of coils 17, 18 is connected by means of conductor 143 with upper switch terminal 142, and the other end of coil group 17, 18 is connected by means of interconnect 144 with coil group 31, 32 and thence by way of connector 147 with the junction point 137.

Thus, tracing the B-phase current path, it will be seen that, as with the case of the A-phase current, in the "down" position of the switch three polar belts of four coils each are provided, the polar belts for the B-phase current, however, being defined by adjacent pairs of small coil groups. The three B-phase polar belts in the "down" position of the switch are identified by brackets B–6. Similarly, the coil groups 33—36, 9—12, and 21—24 have C-phase current applied to them to form true poles of like polarity, and these three C-phase pole belts are designated by brackets C–6 in Figure 1.

Attention is directed to the fact that only 12 leads are brought out of the stator winding to the switch terminals, the remaining terminals of the switch being connected by means of crossovers to the terminals to which the leads connect.

In the embodiment of the invention shown in Figure 2 the coils of a 36-slot stator winding are connected in groups for 6- and 8-pole operation to provide the motor with synchronous speeds of 1200 R. P. M. and 900 R. P. M., respectively. In this embodiment of the invention the coils of the single stator winding are connected in a larger number of groups than in the Figure 1 version, to provide for the larger number of poles, and the groups may contain either one, two or three coils. As with the Figure 1 arrangement, the stator of the Figure 2 version has a plurality of smaller coil groups located between pairs of adjacent large coil groups. The Figure 2 version differs from the Figure 1 embodiment in that in both the "up" and the "down" positions of the 6-pole double-throw switch 109 each polar belt comprises two or more adjacent groups of coils connected in series with one another through the switch. However, despite the greater number of coil groups within the stator, due to the necessity for accommodating a greater number of polar belts than in the Figure 1 embodiment, the circuit of the Figure 2 arrangement, like that of Figure 1, has only 12 leads which are brought to the switch terminals from the stator winding, and the groups of coils are mainly connected by internal connections, which would have to be present in any event in a motor having a large number of poles.

The brackets A6 in Figure 2 designate the polar belts formed by groups of coils connected with the A-phase current in the "up" (6-pole) position of the switch; the brackets A8 designate the polar belts formed by groups of coils connected with the A-phase current in the "down" (8-pole) position of the switch, and so on.

It will be understood that in the Figure 2 embodiment of the invention, as in that of Figure 1, the coils connected with each current phase have current flowing in them in the same direction so that they all provide true poles of like polarity, and again consequent poles exist in both positions of the switch.

In some instances it is conceivable that the internal connections shown in the circuits of Figures 1 and 2 may be inconvenient to make in actual practice, and in such cases an arrangement such as that shown in Figure 3 may be more practical. Figure 3 is a circuit diagram of a 36-slot stator winding connected to provide 4-pole and 6-pole operation (at speeds of 1800 R. P. M. and 1200 R. P. M., respectively), and in that respect it is similar to Figure 1, but in the case of the Figure 3 circuit, 13 leads instead of 12 are brought out of the stator winding and connected with the terminals of a 7-pole double-throw switch 209. Essentially the difference between the circuits of Figure 1 and Figure 3 is that current flows in a different sequence through the several coil groups connected with each terminal, although it will be seen that the disposition of the polar belts, designated by brackets A4, B4, C4, and A6, B6, C6, is identical for corresponding switch positions in the two circuits.

More specifically, it will be seen from a comparison of Figures 1 and 3 that in the "up" position of the double-throw switch 109 (Figure 1) B-phase current flows from terminal B by way of input lead 107 through the groups of coils 7, 8 and 29, 30 and thence, by way of the switch, through coils 9, 10, 11, 12 and finally (again via switch 109) through coils 25, 26, 27, 28. In the circuit of Figure 3, however, current from the coils 7, 8 and 29, 30, connected with the B-phase, is routed first through the coils 25, 26, 27, 28 (by the way of the switch 209) and then (again by way of the switch) into the coils 9, 10, 11, 12. Similarly in the Figure 1 circuit the coil group 21, 22, 23, 24 is directly and permanently connected with the junction 137 by means of the lead 150, while in the Figure 3 circuit this coil group is connected with junction 137' by means of a lead 160 so connected with the switch 209 that in either position thereof A-phase current from the group of coils remote from the terminal A must be conducted to the junction through the switch. It will also be observed that in the "down" position of the respective switches 109 and 209 the sequence in which A- and C-phase currents flow through the coil groups energized through the switch is similarly reversed in the Figure 1 and Figure 3 arrangements.

It will be understood that the present invention is not limited in its applicability to a 36-slot stator, nor to the pole combinations hereinbefore illustrated. It is applicable to virtually any practical combination involving even numbers of poles differing by two or four with the exception of a 2- and 4-pole combination, the latter being out of the question because of the impracticability of obtaining only one true and one consequent pole per current phase. Those skilled in the art will readily appreciate that with larger numbers of poles it is desirable to use a stator having a larger number of slots than 36.

More specifically the number of stator slots (or coils) required for a 3-phase motor embodying the principles of this invention must be a multiple of both one and one-half times the number of poles produced at one speed of the motor and one and one-half times the number of poles produced at the other speed of the motor; and for a 2-phase motor embodying the principles of this invention the number of stator slots required must be a multiple of the number of poles produced at each speed of the motor.

Figure 4 is a simplified schematic diagram of a 72-slot stator for a 3-phase motor embodying the principles of this invention and providing 8- and 12-pole operation at speeds of 900 R. P. M. and 600 R. P. M., respectively. In this diagram the groups of coils connected to form the several polar belts are not shown in the geometrical relationship to one another in which they are disposed on the stator, but the connections between the coils may be readily traced, the coil numbering system being the same as in the previously described figures.

Attention is directed to the fact that the internal wiring of the 6-pole double-throw switch is the same in every embodiment in which it is employed.

It will be understood that one or more speeds in addition to those provided by the present invention can be obtained by the employment of more than one winding, utilizing the two-speed arrangement of the present invention in combination with past expedients for obtaining a plurality of speeds in multi-phase induction motors or in combination with another winding arranged and connected in accordance with the principles of this invention.

From the foregoing description taken together with the accompanying drawings, it will be apparent that this invention provides a two-speed stator winding for a polyphase induction motor, the coils of which are connectible in two circuit arrangements by means of a double-throw multi-pole switch to provide speeds which are in a ratio to one another of less than 2 to 1; and wherein the motor operates with both true and consequent poles at both of its speeds, and polar belts are uniformly distributed at spaced circumferential intervals around the stator to provide smooth, efficient operation.

What I claim as my invention is:

1. A two-speed polyphase motor wherein both speeds are obtained with a single stator winding, characterized by: circumferentially adjacent coils of the stator winding being series connected in large and small groups with a plurality of adjacent small groups disposed between pairs of adjacent large groups; an input lead for each current phase, each said lead being connected with one end of a coil group; certain of said coil groups circumferentially spaced from one another around the stator being connected with one another; and the thus connected groups being so disposed that leads from the ends of the coil groups not connected to the mains or to other coil groups may be connected to the terminals of a multiple pole double-throw switch to be thereby connectible with one another in one closed position of the switch to produce one number of true poles of like polarity for each input lead and an equal number of consequent poles, to provide high speed operation, and in the other closed position of the switch to produce a larger number of true poles of like polarity for each input lead and an equal larger number of consequent poles, to provide slow speed operation.

2. A two-speed polyphase motor wherein both speeds are obtained with a single stator winding characterized by: the coils of the stator winding being arranged in large and small groups with the large groups disposed in adjacent pairs located at spaced intervals around the circumference of the stator, and with a plurality of small groups located between the pairs of large groups; an input lead for each current main, each of said leads being connected with one end of a coil group; means for connecting the coil groups in a first circuit arrangement wherein each large group of coils is connected in series with at least one adjacent small group of coils to form a set of coils, wherein each set of coils is connected with one of the input leads to have current of one phase flowing through it in a direction to provide a true pole, the several sets of coils connected with each input lead being spaced from one another around the circumference of the stator to provide an equal number of consequent poles; and means for connecting the coil groups in a second circuit arrangement wherein pluralities of adjacent smaller coil groups are connected in series with one another to provide composite coil groups, and wherein each of said composite coil groups is connected with an input lead other than that with which its adjacent larger coil groups are connected to define true poles of like polarity for each current phase which true poles are spaced from one another around the circumference of the stator and provide an equal number of consequent poles.

3. A two-speed polyphase motor wherein both speeds are obtained with a single stator winding, the coils of which are arranged in groups connectible in one way by a multiple pole double-throw switch to produce one number of poles for high speed operation and in another way to produce a larger number of poles for low speed operation, characterized by the fact that for both high and low speed the coil groups are so connected that all true poles are substantially equispaced from one another around the circumference of the stator and are of like polarity for each current phase so that for each speed one-half the number of poles producing said speed are consequent poles substantially equispaced from one another around the circumference of the stator.

4. In a two-speed polyphase motor wherein both speeds are obtained with a single stator winding having its coils series connected with one another in groups, and having an input lead for each current main, each of said leads being connected with one end of a coil group: means for connecting the coil groups in a high speed circuit arrangement wherein each group of coils is connected in series with one input lead and with at least one other circumferentially adjacent group of coils to define a polar belt, the connections in said high speed circuit arrangement being such that the polar belts connected with each input lead are spaced from one another around the circumference of the stator and current is constrained to flow through them in the same direction to provide the same number of circumferentially spaced true poles of like polarity for each current phase and an equal number of consequent poles; and means for connecting the coil groups in a low speed circuit ararngement wherein a lesser number of circumferentially adjacent coils comprise each polar belt but a greater number of polar belts are connected with each input lead, the connections in said low speed circuit arrangement being such that said greater number of polar belts are spaced from one another around the circumference of the stator and current is constrained to flow through them in the same direction to provide a greater number of circumferentially spaced true poles of like polarity for each current phase and an equal greater number of consequent poles.

5. A two-speed polyphase motor wherein both speeds are obtained with a single stator winding having its coils series connected with one another in groups and having an input lead for each current phase, each said lead being connected with one end of a coil group, characterized by the fact that certain of the coil groups located at circumferentially spaced intervals around the stator are connected with one another; and further characterized by connector leads from the coil group ends not connected to other coil groups or to input leads, said connector leads being connectible with one another in one circuit arrangement to produce one number of true poles of like polarity for each input lead, each defined by a belt of adjacent series connected coils, and an equal number of consequent poles, to provide high speed operation, and connectible in a second circuit arrangement to produce a larger number of true poles of like polarity for each input lead, each defined by a belt of adjacent series connected coils, and an equal larger number of consequent poles, to provide slow speed operation.

No references cited.